(No Model.)
G. H. BENNETT.
CORE FOR CASTING.
No. 404,673. Patented June 4, 1889.
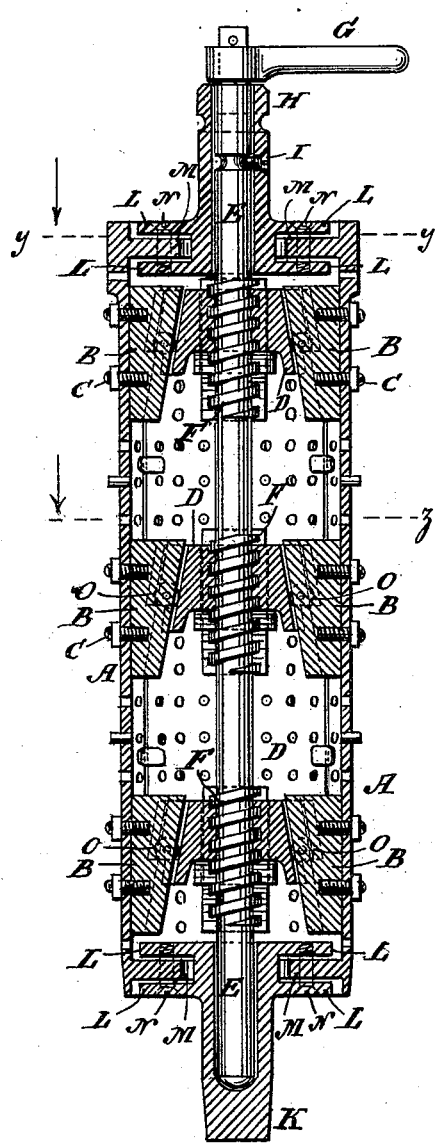
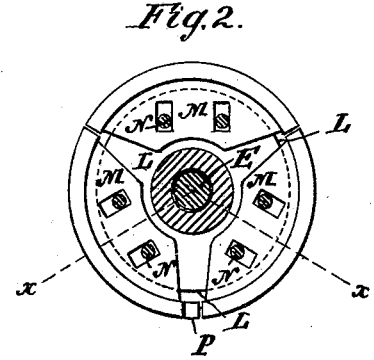
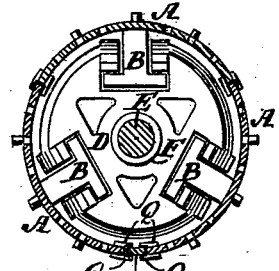
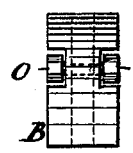 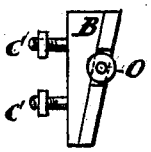
WITNESSES:
Edward Wolff
William M. Miller
INVENTOR:
George H. Bennett.
BY Van Santvoord & Hauff
ATTORNEY
N. PETERS, Photo-Lithographer, Washington, D. C.

UNITED STATES PATENT OFFICE.

GEORGE H. BENNETT, OF BROOKLYN, NEW YORK.

CORE FOR CASTING.

SPECIFICATION forming part of Letters Patent No. 404,673, dated June 4, 1889.

Application filed December 20, 1888. Serial No. 294,178. (No model.)

*To all whom it may concern:*

Be it known that I, GEORGE H. BENNETT, a citizen of the United States, residing at Brooklyn, in the county of Kings and State of New York, have invented new and useful Improvements in Cores for Castings, of which the following is a specification.

This invention has for its object to provide a novel expansible core for casting water and gas pipes and similar articles; and the invention consists in the features of construction and combination of devices hereinafter described and claimed, reference being made to the accompanying drawings, in which—

Figure 1 is a longitudinal section of a core along the line $x\ x$, Fig. 2. Fig. 2 is a section along the line $y\ y$, Fig. 1. Fig. 3 is a section along the line $z\ z$, Fig. 1. Fig. 4 is a plan view of an incline. Fig. 5 is a side elevation of an incline. Fig. 6 is a side elevation of a traveler. Fig. 7 is a detail view of a filling-strip.

Similar letters indicate corresponding parts.

The shell A is expansible, being made in sections which can be separated a certain distance or brought near to one another. The shell-sections are provided with inclines B. Bolts or screws C are shown holding the inclines B in place. The travelers D are shown connected to the inclines B by a tongue-and-groove connection. By turning the shaft or spindle E in one direction or another the external screw-threads F on said spindle, working in screw-threaded sockets in the travelers, will move the travelers so as to spread or collapse the inclines B and shell-sections A.

The spindle E can be rotated in any suitable manner, as by a handle or wrench G. Said spindle rests in a housing or bearing H, and a screw or lip I, engaging a groove, holds the spindle in place in the housing or bearing, while the spindle is free to turn. The free end of the spindle rests in the housing or bearing K.

The housings H K have flanges L. The shell-sections A have lips or projections M. Said lips M and flanges L are joined by pins N. Said pins N are shown secured to the flanges L and passing through slots in the lips M, Fig. 2. Said pins N thus hold the lips M and shell-sections A in place while allowing a certain play of the lips and shell-sections, and said pins N also steady the lips and shell-sections. The flanges L are shown arranged in pairs, and each lip M is steadied or guided between a pair of flanges L.

In order to secure easy movement of the travelers D and inclines B, rollers O are provided, said rollers being shown mounted on the inclines B. When the shell A is expanded, a filling-piece P, Figs. 2 and 7, can be used to fill the space between the edges of two sections. Guides Q, Fig. 3, can be used to properly guide the filling-piece P when being moved into place. An eye R in the filling-piece allows of the use of a tool to readily withdraw the filling-piece.

What I claim as new, and desire to secure by Letters Patent, is—

1. A core for casting consisting of the sectional expansible shell having inclines, the travelers having screw-threaded sockets extending therethrough, and the rotary shaft supported in end bearings and having screw-threads engaging the screw-threads of the sockets to adjust the travelers, substantially as described.

2. A core for casting consisting of the sectional expansible shell having attached inclines provided with revolving rollers projecting beyond their inclined faces, the travelers having screw-threaded sockets and resting against the rollers on the inclines, and the rotary shaft mounted in end bearings and having screw-threads engaging the screw-threads of the sockets to adjust the travelers, substantially as described.

3. The combination of the sectional expansible shell having lips or projections M, the end bearings having flanges L joined to the lips or projections by pin-and-slot connection, the rotary shaft E, and means, substantially as described, for expanding the shell by the rotation of the shaft, substantially as described.

4. The combination of the expansible shell having lips or projections M, the end bearings having flanges L, arranged in pairs, receiving between them and guiding the lips or projections, the rotary shaft, and means for expanding the shell by rotation of the shaft, substantially as described.

In testimony whereof I have hereunto set my hand and seal in the presence of two subscribing witnesses.

GEORGE H. BENNETT.

Witnesses:
 WM. C. HAUFF,
 E. F. KASTENHUBER.